(12) United States Patent
Ribu et al.

(10) Patent No.: US 12,000,091 B2
(45) Date of Patent: Jun. 4, 2024

(54) POLYMER COATED PAPER AND PAPERBOARD

(71) Applicant: Stora Enso OYJ, Helsinki (FI)

(72) Inventors: Ville Ribu, Lappeenranta (FI); Kimmo Nevalainen, Kotka (FI)

(73) Assignee: Stora Enso OYJ, Helsinki (FI)

( * ) Notice: Subject to any disclaimer, the term of this patent is extended or adjusted under 35 U.S.C. 154(b) by 485 days.

(21) Appl. No.: 17/282,073

(22) PCT Filed: Oct. 1, 2019

(86) PCT No.: PCT/IB2019/058325
§ 371 (c)(1),
(2) Date: Apr. 1, 2021

(87) PCT Pub. No.: WO2020/070632
PCT Pub. Date: Apr. 9, 2020

(65) Prior Publication Data
US 2021/0317612 A1    Oct. 14, 2021

(30) Foreign Application Priority Data

Oct. 4, 2018 (SE) .................................. 1851198-0

(51) Int. Cl.
*D21H 19/28* (2006.01)
*C09D 167/02* (2006.01)

(52) U.S. Cl.
CPC ........... *D21H 19/28* (2013.01); *C09D 167/02* (2013.01)

(58) Field of Classification Search
CPC ........ D21H 19/28; D21H 19/20; D21H 19/22; D21H 19/62; D21H 19/82; D21H 19/826; B32B 2270/00; B32B 2307/306; B32B 2307/31; B32B 2307/4026; B32B 2307/5825; B32B 2307/718; B32B 2307/7244; B32B 2307/7246; B32B 2439/02; B32B 7/12; B32B 27/08; B32B 27/10; B32B 27/20; B32B 27/32; B32B 27/36; B32B 29/00; B32B 29/002; B32B 29/08; C08G 63/672; B29C 48/00; C09D 167/00; C09D 167/02
See application file for complete search history.

(56) References Cited

U.S. PATENT DOCUMENTS

| | | | |
|---|---|---|---|
| 4,352,925 A | 10/1982 | Petke et al. | |
| 5,294,483 A | 3/1994 | Beavers et al. | |
| 5,480,718 A | 1/1996 | Shigemoto et al. | |
| 5,851,608 A | 12/1998 | Yamada et al. | |
| 7,413,800 B2 * | 8/2008 | Wood, Jr. ............... | B32B 37/153 428/323 |
| 9,656,447 B2 * | 5/2017 | Sakellarides ........... | B32B 27/08 |
| 2005/0208282 A1 * | 9/2005 | Wood ....................... | B32B 7/12 428/323 |
| 2006/0057314 A1 | 3/2006 | Ikeda et al. | |
| 2009/0258207 A1 | 10/2009 | Miyaji et al. | |
| 2012/0189832 A1 | 7/2012 | Kawasaki et al. | |
| 2015/0030793 A1 | 1/2015 | Miyabe et al. | |
| 2016/0075468 A1 | 3/2016 | Kobayashi et al. | |
| 2017/0136747 A1 * | 5/2017 | Torradas ................ | B32B 29/002 |
| 2021/0317612 A1 * | 10/2021 | Ribu .................. | C09D 167/025 |
| 2022/0243007 A1 * | 8/2022 | Rastorguev .......... | C08G 63/199 |

FOREIGN PATENT DOCUMENTS

| | | | | |
|---|---|---|---|---|
| CN | 116157426 A | * | 5/2023 | |
| EP | 2481581 A1 | | 8/2012 | |
| EP | 3970966 A1 | * | 3/2022 | ............. B32B 27/00 |
| JP | H02274536 A | | 11/1990 | |
| JP | H08318606 A | | 12/1996 | |
| JP | 2006111001 A | | 4/2006 | |
| JP | 2012066506 A | | 4/2012 | |
| JP | 2013095058 A | | 5/2013 | |
| WO | 2015146496 A1 | | 1/2015 | |

OTHER PUBLICATIONS

Swedish Search Report from corresponding Swedish application No. 1851198-0, dated Mar. 20, 2019.
International Search Report from corresponding PCT application No. PCT/IB2019/058325 dated Dec. 13, 2019.

* cited by examiner

*Primary Examiner* — Jose A Fortuna
(74) *Attorney, Agent, or Firm* — Greer, Burns & Crain, Ltd.

(57) ABSTRACT

The present invention relates to paper or paperboard comprising at least one coating layer formed by extrusion coating of a PET (polyethylene terephthalate) resin, characterized in that the PET resin comprises at least 50% by weight of a PET copolymer having an intrinsic viscosity of less than 0.7 dl/g, preferably less than 0.65 dl/g, as determined according to ISO 1628.

16 Claims, 5 Drawing Sheets

POLYMER COATED PAPER AND PAPERBOARD

This application is a U.S. National Phase under 35 U.S.C. § 371 of International Application No. PCT/IB2019/058325, filed Oct. 1, 2019, which claims priority under 35 U.S.C. §§ 119 and 365 to Swedish Application No. 1851198-0, filed Oct. 4, 2018.

TECHNICAL FIELD

The present disclosure relates to polymer coated paper and paperboard. More specifically, the present disclosure relates to paper or paperboard comprising at least one coating layer formed by extrusion coating of a PET (polyethylene terephthalate) resin.

BACKGROUND

Coating of paper and paperboard with plastics is often employed to combine the mechanical properties of the paperboard with the barrier and sealing properties of a plastic film. Paperboard provided with even a relatively small amount of a suitable plastic material can provide the properties needed to make the paperboard suitable for many demanding applications.

Extrusion coating is a process by which a molten plastic material is applied to a substrate, such as paper or paperboard to form a very thin, smooth and uniform layer. The coating can be formed by the extruded plastic itself, or the molten plastic can be used as an adhesive to laminate a solid plastic film onto the substrate. Common plastic resins used in extrusion coating include polyethylene (PE), polypropylene (PP), and polyethylene terephthalate (PET).

Extrusion coating and lamination may be used to achieve, e.g., moisture protection, barrier properties for water vapour, oxygen, aromas, etc., dirt or grease resistance, heat sealability, and/or to impart a desired finish or texture to a substrate surface.

Paper or paperboard as such is generally suitable for the packaging of dry products. However, untreated paperboard is of limited use in direct contact with moist or greasy products, because moisture will affect the mechanical properties of the packaging, and absorbed grease will cause staining of the paper. These effects will impair the protective function as well as the appearance of the packaging.

Extrusion coating or lamination drastically expands the range applications for paper and paperboard. The thin plastic layer imparts resistance to grease and moisture and also in some instances heat resistance. The plastic coatings can also be used for heat sealing. Depending on the application, the paper or paperboard may be extrusion coated on one or both sides.

One application in which the properties of extrusion coated or laminated paperboard is especially useful is for ovenable packs, i.e. packagings which can be used for cooking or heating the packaged food product in an oven. In ovenable packs, the packaging material must be able to resist moisture and grease at elevated temperatures without absorption into the paperboard.

PET has been found to have excellent properties for use in ovenable packs, including high grease resistance at elevated temperatures, heat sealability and heat resistance. PET also increases the stiffness and tear strength of the coated paperboard.

For environmental and economic reasons, it is generally desirable to keep the plastic coating as thin as possible, as long as the barrier and protective properties are maintained at an acceptable level. Generally, as long as the coating is uniform and free from defects, only a very thin layer is required for providing sufficient barrier and protective properties. In many cases however, further reduction of the thickness (or grammage) of the plastic coating is limited by impaired adhesion and stability of the film formation in the extrusion process, and formation of pinholes. For example, conventional PET resins cannot be extrusion coated on paper or paperboard to a grammage of less than 40 $g/m^2$, without loss of adhesion and stability of the film formation leading to imperfections in the coated product.

In extrusion coating and lamination of paper and paperboard with plastics it is very important that satisfactory adhesion of the plastic to the substrate is obtained. The plastic adhesion depends mainly on the surface properties of the substrate and the heat content of the plastic melt when applied to the paperboard. Inadequate adhesion between the plastic coating and the paper or paperboard is a common and constant problem.

Pinholes are microscopic holes that can form in the plastic film during the coating process. The main reasons for the appearance of pinholes include irregularities in the substrate surface (e.g. high surface roughness or loose fibres), an uneven coating distribution or too low a coating grammage.

Adhesion can be improved by surface treatment of the substrate for example with corona discharge or ozone, but there remains a need for improved solutions for reducing plastic coating grammage, particularly in extrusion coating of PET, while maintaining good adhesion and stability of the film formation in the extrusion process.

DESCRIPTION OF THE INVENTION

It is an object of the present disclosure to reduce the minimum grammage of a PET resin required to achieve sufficient adhesion and stability of the film formation in extrusion coating.

It is a further object of the present disclosure to provide a PET resin coated paper or paperboard, which allows for reduced grammage of the PET resin, such as a grammage of less than 40 $g/m^2$, while maintaining good adhesion of the PET resin to the paper or paperboard.

It is a further object of the present disclosure to provide a PET resin coated paper or paperboard with improved adhesion of the PET resin to the paper at low grammage of the PET resin.

It is a further object of the present disclosure to provide a method for manufacturing PET resin coated paper or paperboard, which allows for reduced grammage of the PET resin, such as a grammage of less than 40 $g/m^2$, while maintaining good stability of the film formation in the extrusion process.

It is a further object of the present disclosure to provide a method for manufacturing PET resin coated paper or paperboard, which allows for improved stability of the film formation in the extrusion process at low grammage of the PET resin.

The above mentioned objects, as well as other objects as will be realized by the skilled person in the light of the present disclosure are achieved by the various aspects of the present disclosure.

According to a first aspect illustrated herein, there is provided a paper or paperboard comprising at least one coating layer formed by extrusion coating of a PET (polyethylene terephthalate) resin, characterized in that the PET resin comprises at least 50% by weight of a PET copolymer having an intrinsic viscosity of less than 0.7 dl/g, preferably less than 0.65 dl/g, as determined according to ISO 1628.

Paper generally refers to a material manufactured in thin sheets from the pulp of wood or other fibrous substances comprising cellulose fibers, used for writing, drawing, or printing on, or as packaging material.

Paperboard generally refers to strong, thick paper or cardboard comprising cellulose fibers used for boxes and other types of packaging. Paperboard can either be bleached or unbleached, coated or uncoated, and produced in a variety of thicknesses, depending on the end use requirements.

The term coating, as used herein, refers to an operation in which the surface of a substrate is covered with a composition to impart a desired properties, finish or texture to the substrate. The coating can be a single or multilayer coating wherein the PET coating resin can be used in one or several layers. The coating can be applied to one side or both sides of the paper or paperboard.

PET extrusion coatings for ovenable packs today are produced using similar PET-grades as those used in PET-bottle manufacturing. Typical PET grades used have an intrinsic viscosity of about 0.8-0.9 dl/g, as determined according to ISO 1628. These conventional PET resins cannot be extrusion coated on paper or paperboard to a coating grammage of less than 40 g/m$^2$ without loss of adhesion and stability of the film formation leading to imperfections in the coated product.

The present inventors have now found that using a specific type of PET resin with a low intrinsic viscosity, the minimum grammage of PET resin required to achieve sufficient adhesion and stability of the film formation in extrusion coating of paper and paperboard can be reduced. Adequate adhesion is important in many converting operations, such as printing and heat sealing.

Additionally, the specific type of PET resin used in the present invention has been found to offer further advantages compared to standard extrusion coating grade PET, including better runnability allowing for higher line speed in the extrusion coating process, as well as reduced oxygen permeability.

The PET resin used in the present invention comprises at least 50% by weight of a PET copolymer having an intrinsic viscosity of less than 0.7 dl/g, preferably less than 0.65 dl/g, as determined according to ISO 1628. In some embodiments, the PET copolymer has an intrinsic viscosity in the range of from 0.55 to 0.63 dl/g, preferably in the range of from 0.57 to 0.61 dl/g, as determined according to ISO 1628. In one preferred embodiment, the PET copolymer has an intrinsic viscosity of 0.59 dl/g.

In some embodiments, the PET copolymer is a PET copolymer comprising repeat units from terephthalic acid, isophthalic acid, monoethylene glycol, and diethylene glycol. The combination of a low intrinsic viscosity and a PET structure comprising repeat units from terephthalic acid, isophthalic acid, monoethylene glycol, and diethylene glycol have been found to provide additional improvements in adhesion and in runnability. This allows for further reduction of the necessary PET resin grammage in extrusion coating. Surprisingly, the copolymer composition does not limit heat resistance of the coating as compared to conventional high intrinsic viscosity PET polymers.

In some embodiments, the molar ratio of terephthalic acid:isophthalic acid in the PET copolymer is in the range of from 99:1 to 50:50.

In some embodiments, the molar ratio of monoethylene glycol:diethylene glycol in the PET copolymer is in the range of from 99:1 to 50:50.

In some embodiments, the PET copolymer consists of repeat units from terephthalic acid, isophthalic acid, monoethylene glycol, and diethylene glycol.

In a preferred embodiment, the PET resin comprises at least 50% by weight of a PET copolymer, wherein said PET copolymer comprises repeat units from terephthalic acid, isophthalic acid, monoethylene glycol, and diethylene glycol, wherein the molar ratio of terephthalic acid:isophthalic acid in said PET copolymer is in the range of from 99:1 to 50:50 and the molar ratio of monoethylene glycol:diethylene glycol in said PET copolymer is in the range of from 99:1 to 50:50, and wherein said PET copolymer has an intrinsic viscosity in the range of from 0.57 to 0.61 dl/g, as determined according to ISO 1628.

The PET resin of the invention comprises at least 50% by weight of the PET copolymer having an intrinsic viscosity of less than 0.7 dl/g. In some embodiments, the PET resin comprises at least 70% by weight, preferably at least 90% by weight, of the PET copolymer. The PET resin of the invention may also consist, or substantially consist, of the PET copolymer. An embodiment wherein the PET resin consists, or substantially consists, of the PET copolymer is of particular interest since such a monomaterial coating offers obvious recycling advantages.

The remainder of the PET resin can be made up of other polymeric or non-polymeric coating constituents. In other words, the PET resin can be a blend of the PET copolymer and another polymer. In some embodiments, the remainder of the PET resin is comprised of a PET having an intrinsic viscosity 0.7 dl/g or higher, as determined according to ISO 1628. In some embodiments, the remainder of the PET resin is comprised of a PET having an intrinsic viscosity 0.7-0.9 dl/g, as determined according to ISO 1628.

The formulation of a coating resin may vary greatly depending on the intended use of the coating and the coated paper or paperboard. Coating compositions may include a wide range of ingredients in varying quantities to improve the end performance of the product or processing of the coating. In some embodiments, the PET resin comprises at least one additional component selected from the group consisting of a polymer other than a PET, a pigment (e.g. TiO$_2$ or carbon black), a dye, and a filler (e.g. CaCO$_3$, Talc).

The PET resin used in the present invention allows for production of coated paper or paperboard with improved stability of the film formation and adhesion of the PET resin to the paper at low grammage of the PET resin, such as a grammage of less than 50 g/m$^2$. Thus, in some embodiments, the PET resin is applied to the substrate at a grammage of less than 50 g/m$^2$.

The PET resin used in the present invention allows for production of an extrusion coated paper or paperboard with reduced grammage of the PET resin, such as a grammage of less than 40 g/m$^2$, while maintaining good stability of the film formation and adhesion of the PET resin to the paper or paperboard. Thus, in some embodiments, the PET resin is applied to the substrate at a grammage of less than 40 g/m$^2$, more preferably less than 35 g/m$^2$.

The paper or paperboard of the present invention may be coated only with the PET resin comprising at least 50% by weight of a PET copolymer having an intrinsic viscosity of less than 0.7 dl/g, preferably less than 0.65 dl/g, as determined according to ISO 1628. Alternatively, the paper or paperboard of the present invention may include the PET resin coating layer as one of two or more polymeric coating layers. As the PET resin coating layer of the invention provides good stability of the film formation and adhesion of the PET resin to the paper or paperboard it may preferably be used as the first (or innermost) coating layer applied directly onto the paper or paperboard surface. The extrusion coated PET resin coating layer may serve to promote adhesion of subsequently applied or coextruded polymeric coating layers. The extrusion coated PET resin coating layer may serve as an adhesive for a polymeric film in an extrusion film lamination process.

In some embodiments, the paper or paperboard extrusion coated with the PET resin, further comprises at least one additional polymeric coating layer disposed on top of the extrusion coated PET resin, wherein the additional polymeric coating layer has a composition different from the extrusion coated PET resin.

In some embodiments, the at least one additional coating layer is formed by extrusion coating or by extrusion film lamination.

In some embodiments, the at least one additional coating layer comprises polyethylene terephthalate (PET), polyethylene (PE), polypropylene (PP) and/or polylactic acid (PLA). In a preferred embodiment, the at least one additional coating layer comprises polyethylene terephthalate (PET).

A PET resin comprising at least 50% by weight of a PET copolymer having an intrinsic viscosity of less than 0.7 dl/g has good heat sealing properties and may also be useful as an outermost coating layer (or top layer) applied on top of an intermediate polymeric coating layer.

In some embodiments, the paper or paperboard extrusion coated with the PET resin, further comprises at least two additional polymeric coating layers disposed on top of the extrusion coated PET resin, wherein at least one of the additional polymeric coating layers has a composition different from the extrusion coated PET resin, and wherein the outermost additional polymeric coating layer comprises at least 50% by weight of a PET copolymer having an intrinsic viscosity of less than 0.7 dl/g, preferably less than 0.65 dl/g, as determined according to ISO 1628.

In some embodiments, the PET resin and additional PET coating layers on the paper or paperboard have a total combined grammage of less than 50 g/m$^2$, preferably less than 40 g/m$^2$, more preferably less than 35 g/m$^2$.

The inventive paper or paperboard is particularly useful in the manufacture of ovenable trays. According to a second aspect illustrated herein, there is provided an ovenable tray comprising paper or paperboard according to the first aspect described herein.

According to a third aspect illustrated herein, there is provided the use of a PET resin comprising at least 50% by weight of a PET copolymer having an intrinsic viscosity (IV) of less than 0.7 dl/g, preferably less than 0.65 dl/g, as determined according to ISO 1628, for coating a paper or paperboard substrate.

The present inventors have found that using a specific type of PET resin with a low intrinsic viscosity, the minimum grammage of PET resin required to achieve sufficient adhesion and stability of the film formation in extrusion coating of paper and paperboard can be reduced.

The PET resin of the third aspect may be further defined as set out above with reference to the first aspect.

In a preferred embodiment, the PET resin comprises at least 50% by weight of a PET copolymer, wherein said PET copolymer comprises repeat units from terephthalic acid, isophthalic acid, monoethylene glycol, and diethylene glycol, wherein the molar ratio of terephthalic acid:isophthalic acid in said PET copolymer is in the range of from 99:1 to 50:50 and the molar ratio of monoethylene glycol:diethylene glycol in said PET copolymer is in the range of from 99:1 to 50:50, and wherein said PET copolymer has an intrinsic viscosity in the range of from 0.57 to 0.61 dl/g, as determined according to ISO 1628.

According to a fourth aspect illustrated herein, there is provided a method for manufacturing a PET resin coated paper or paperboard substrate, comprising:
  a) providing paper or paperboard substrate,
  b) applying at least one layer of molten PET resin to a surface of said substrate by extrusion coating,
  c) allowing the PET resin to cool down and solidify, and
  d) recovering the PET resin coated substrate,
  characterized in that the PET resin comprises at least 50% by weight of a PET copolymer having an intrinsic viscosity (IV) of less than 0.7 dl/g, preferably less than 0.65 dl/g, as determined according to ISO 1628.

The PET resin of the fourth aspect may be further defined as set out above with reference to the first aspect.

In a preferred embodiment, the PET resin comprises at least 50% by weight of a PET copolymer, wherein said PET copolymer comprises repeat units from terephthalic acid, isophthalic acid, monoethylene glycol, and diethylene glycol, wherein the molar ratio of terephthalic acid:isophthalic acid in said PET copolymer is in the range of from 99:1 to 50:50 and the molar ratio of monoethylene glycol:diethylene glycol in said PET copolymer is in the range of from 99:1 to 50:50, and wherein said PET copolymer has an intrinsic viscosity in the range of from 0.57 to 0.61 dl/g, as determined according to ISO 1628.

The paper or paperboard of the present invention may be coated only with the PET resin comprising at least 50% by weight of a PET copolymer having an intrinsic viscosity of less than 0.7 dl/g, preferably less than 0.65 dl/g, as determined according to ISO 1628. Alternatively, the paper or paperboard of the present invention may include the PET resin coating layer as one of two or more polymeric coating layers. As the PET resin coating layer of the invention provides good stability of the film formation and adhesion of the PET resin to the paper or paperboard it may preferably be used as the first (or innermost) coating layer applied directly onto the paper or paperboard surface. The extrusion coated PET resin coating layer may serve to promote adhesion of subsequently applied or coextruded polymeric coating layers. The extrusion coated PET resin coating layer may serve as an adhesive for a polymeric film in an extrusion film lamination process.

In some embodiments, the method further comprises applying at least one additional polymeric coating layer disposed on top of the extrusion coated PET resin, wherein the additional polymeric coating layer has a composition different from the first extrusion coated PET resin.

In some embodiments, the at least one additional coating layer comprises polyethylene terephthalate (PET), polyethylene (PE), polypropylene (PP) and/or polylactic acid (PLA). In a preferred embodiment, the at least one additional coating layer comprises polyethylene terephthalate (PET) having a composition different from the first extrusion coated PET resin.

In some embodiments, the at least one additional coating layer is formed by extrusion coating or by extrusion film lamination. In a preferred embodiment, the at least one additional coating layer is formed by coextrusion coating together with the first PET resin.

In some embodiments, at least two additional polymeric coating layers are applied on top of the extrusion coated PET resin, wherein at least one of the additional polymeric coating layers has a composition different from the extrusion coated PET resin, and wherein the outermost additional polymeric coating layer comprises at least 50% by weight of a PET copolymer having an intrinsic viscosity of less than 0.7 dl/g, preferably less than 0.65 dl/g, as determined according to ISO 1628.

In one preferred embodiment the paper or paperboard comprises at least one coating layer formed by extrusion coating of a PET (polyethylene terephthalate) resin, wherein the PET resin consists of at least 50% by weight of a PET copolymer having an intrinsic viscosity of less than 0.7 dl/g, preferably less than 0.65 dl/g, as determined according to ISO 1628, and a PET having an intrinsic viscosity 0.7 dl/g or higher, as determined according to ISO 1628.

In one preferred embodiment the paper or paperboard comprises a first coating layer formed by extrusion coating of a PET (polyethylene terephthalate) resin, wherein the PET resin consists of at least 50% by weight of a PET copolymer having an intrinsic viscosity of less than 0.7 dl/g, preferably less than 0.65 dl/g, as determined according to ISO 1628, and a PET having an intrinsic viscosity 0.7 dl/g or higher, as determined according to ISO 1628, and a second coating layer consisting of a PET having an intrinsic viscosity 0.7 dl/g or higher, as determined according to ISO 1628.

In one preferred embodiment the paper or paperboard comprises:
 a first coating layer formed by extrusion coating of a PET (polyethylene terephthalate) resin, wherein the PET resin consists of at least 50% by weight of a PET copolymer having an intrinsic viscosity of less than 0.7 dl/g, preferably less than 0.65 dl/g, as determined according to ISO 1628, and a PET having an intrinsic viscosity 0.7 dl/g or higher, as determined according to ISO 1628;
 a second coating layer consisting of a PET having an intrinsic viscosity 0.7 dl/g or higher, as determined according to ISO 1628; and
 a third coating layer formed by extrusion coating of a PET resin, wherein the PET resin consists of at least 50% by weight of a PET copolymer having an intrinsic viscosity of less than 0.7 dl/g, preferably less than 0.65 dl/g, as determined according to ISO 1628, and a PET having an intrinsic viscosity 0.7 dl/g or higher, as determined according to ISO 1628.

In a preferred embodiment the PET copolymer comprises repeat units from terephthalic acid, isophthalic acid, monoethylene glycol, and diethylene glycol, wherein the molar ratio of terephthalic acid:isophthalic acid in said PET copolymer is in the range of from 99:1 to 50:50 and the molar ratio of monoethylene glycol:diethylene glycol in said PET copolymer is in the range of from 99:1 to 50:50, and wherein said PET copolymer has an intrinsic viscosity in the range of from 0.57 to 0.61 dl/g, as determined according to ISO 1628.

In some embodiments, the PET resin and additional PET coating layers is applied to the substrate at a total combined grammage of less than 50 g/m$^2$, preferably less than 40 g/m$^2$, more preferably less than 35 g/m$^2$.

The inventors have shown that even with a slightly thinner coating (30 g/m$^2$ as compared to 40 g/m$^2$) the MAP tightness of a substrate coextrusion coated with the inventive PET copolymer and a standard PET grade, is significantly higher than for a substrate extrusion coated with only the standard PET grade.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

EXAMPLES

Example 1—Coextrusion Coating of Paperboard with PET Copolymer and Standard PET Resin A cardboard substrate (Trayforma 350 Natura, Stora Enso Oy) having a grammage of about 350 g/m$^2$ was co extrusion coated in an extrusion coating pilot line with a standard PET grade A and a PET copolymer resin B. The PET copolymer resin B was extruded against the cardboard substrate from the extruder B and the plug was BBAAA-DD. Coextrusion was done with screw speeds of 140 and 100 rpm in the extruder A and B, respectively.

The PET copolymer B was a PET copolymer comprising repeat units from terephthalic acid, isophthalic acid, monoethylene glycol, and diethylene glycol, had an intrinsic viscosity (IV) of 0.59 dl/g, as determined according to ISO 1628. The standard PET grade A had an intrinsic viscosity (IV) of 0.82-0.85 dl/g, as determined according to ISO 1628, a glass transition temperature ($T_g$) of 75-80° C. and a melting temperature ($T_m$) of 245-250° C.

The coextruded substrates (A+B) were analyzed for adhesion, runnability and MAP tightness and compared to corresponding substrates prepared with only the standard PET grade (A).

Adhesion

Adhesion testing was done by visual evaluation based on X-figure cutting method and the evaluation criteria in Table 1. Coating was peeled off manually from the fiber substrate.

TABLE 1

Adhesion testing.

| Value | Evaluation Criteria |
|---|---|
| 0 | Coating does not adhere |

TABLE 1-continued

Adhesion testing.

| Value | Evaluation Criteria |
|---|---|
| 1 | Peeling off without any torn fibers |
| 2 | Peeling off with some torn fibers |
| 3 | Peeling off with area <50% covered by torn fibers |
| 4 | Peeling off with area <50% covered by torn fibers |
| 5 | Peeling off with area totally covered by torn fibers (100%) |

Figure 1:
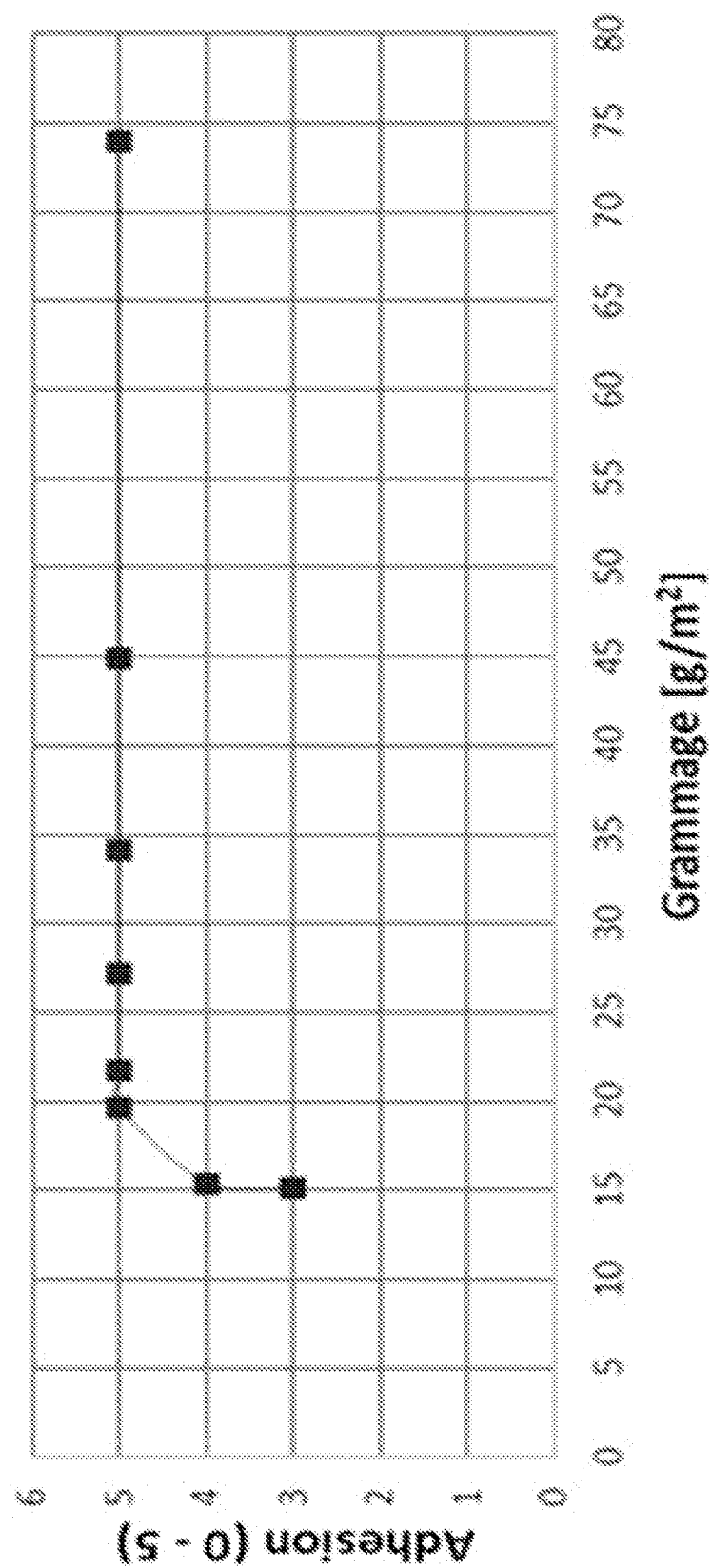
FIG. 1 is a diagram illustrating adhesion to a paperboard substrate as a function of coating grammage of a PET resin according to the invention.

The adhesion testing showed that the coextruded substrates maintained an adhesion value of 5 down to a coating grammage of 20 g/m² (see FIG. 1) The corresponding substrates prepared with only the standard PET grade A maintained an adhesion value of 5 down to a coating grammage of 30 g/m².

Runnability

Runnability was evaluated based on standard deviation of coating grammage in cross- and machine direction. Deviation level below 3 is acceptable.

Figure 2:
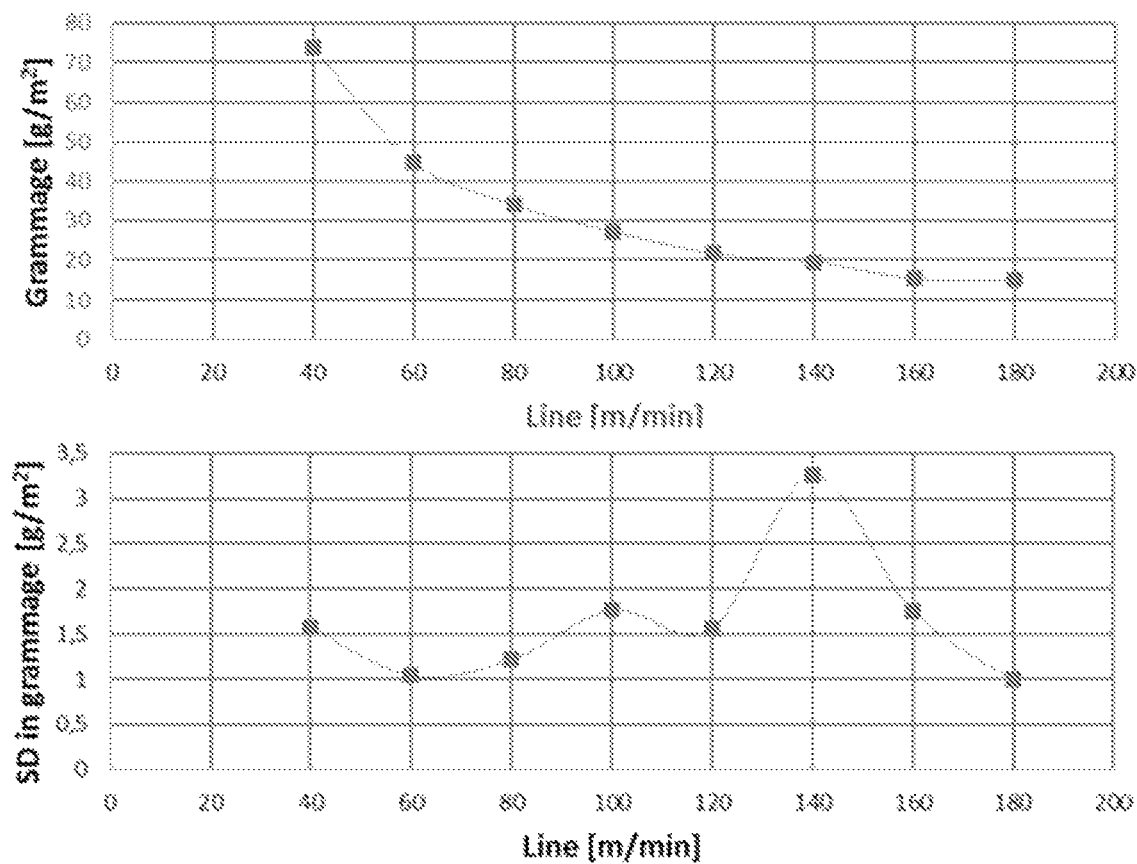
FIG. 2 contains two diagrams illustrating the runnability for a coating of a PET resin according to the invention.

The runnability test showed that the coextruded substrates maintained runnability down to a coating grammage of 15 g/m² (see FIG. 2) The corresponding substrates prepared with only the standard PET grade A maintained runnability down to a coating grammage of 20 g/m².

MAP-Testing

The oxygen permeability of the PET coated substrates was evaluated using so called modified atmosphere packaging (MAP). The coated substrates were used in tray packaging, closed tightly with lid. MAP tightness was evaluated based on oxygen level in packaging after 7, 14 and 28 days. An oxygen level of less than 1 after 14 days is considered acceptable. The results are presented in Table 2.

TABLE 2

MAP-testing.

| Time | Std PET coated substrate (40 g/m²) O₂ amount (%) | Coextruded substrate (30 g/m²) O₂ amount (%) |
|---|---|---|
| 7 d | 0.45 | 0.12 |
| 14 d | 0.93 | 0.37 |
| 28 d | 1.93 | 0.94 |

The results in Table 2 show that even with a slightly thinner coating (30 g/m² as compared to 40 g/m²) the MAP tightness of the coextruded substrate is significantly higher than the substrates prepared with only the standard PET grade A. The standard PET grade has a value of 0.93% oxygen after 14 days. This value, although it is below 1%, would not be considered as acceptable, due to measurement uncertainty. The value 0.37% for the coextruded substrate is clearly within the acceptable range, even with the thinner coating.

Example 2—Comparison of Different PET Copolymers

Five different poly(ethylene terephthalate)s were tested in mono-extrusion coating on the extrusion coating pilot line at Tampere University of Technology (TUT). The tested PET grades are shown in Table 3.

The PET grades differ in chemical structure and intrinsic viscosity. The web material used was Stora Enso Trayforma 190.

Figure 3:
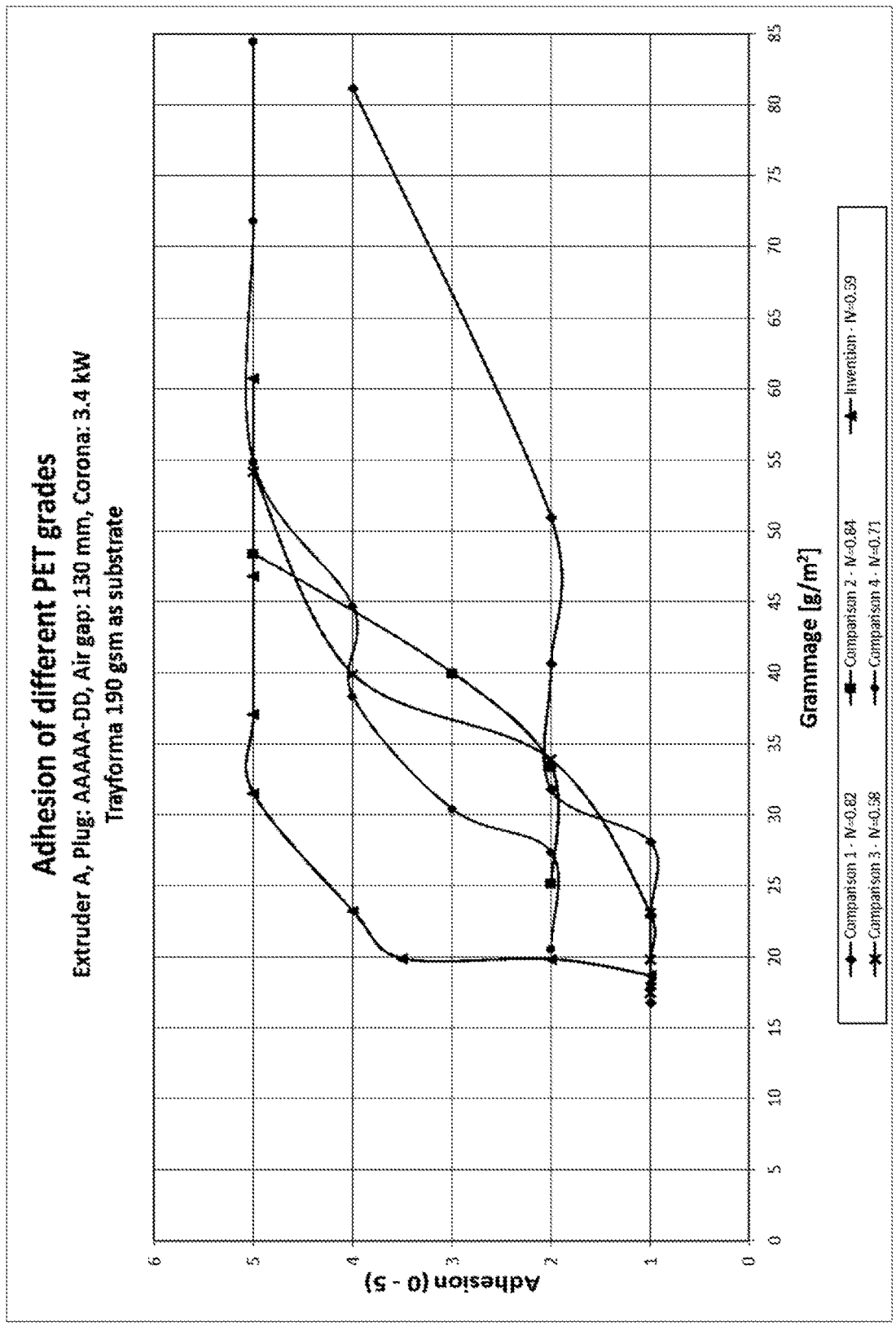
FIG. 3 is a diagram illustrating adhesion as a function of the grammage in extrusion coating (monolayer) for different PET grades.
Figure 4:
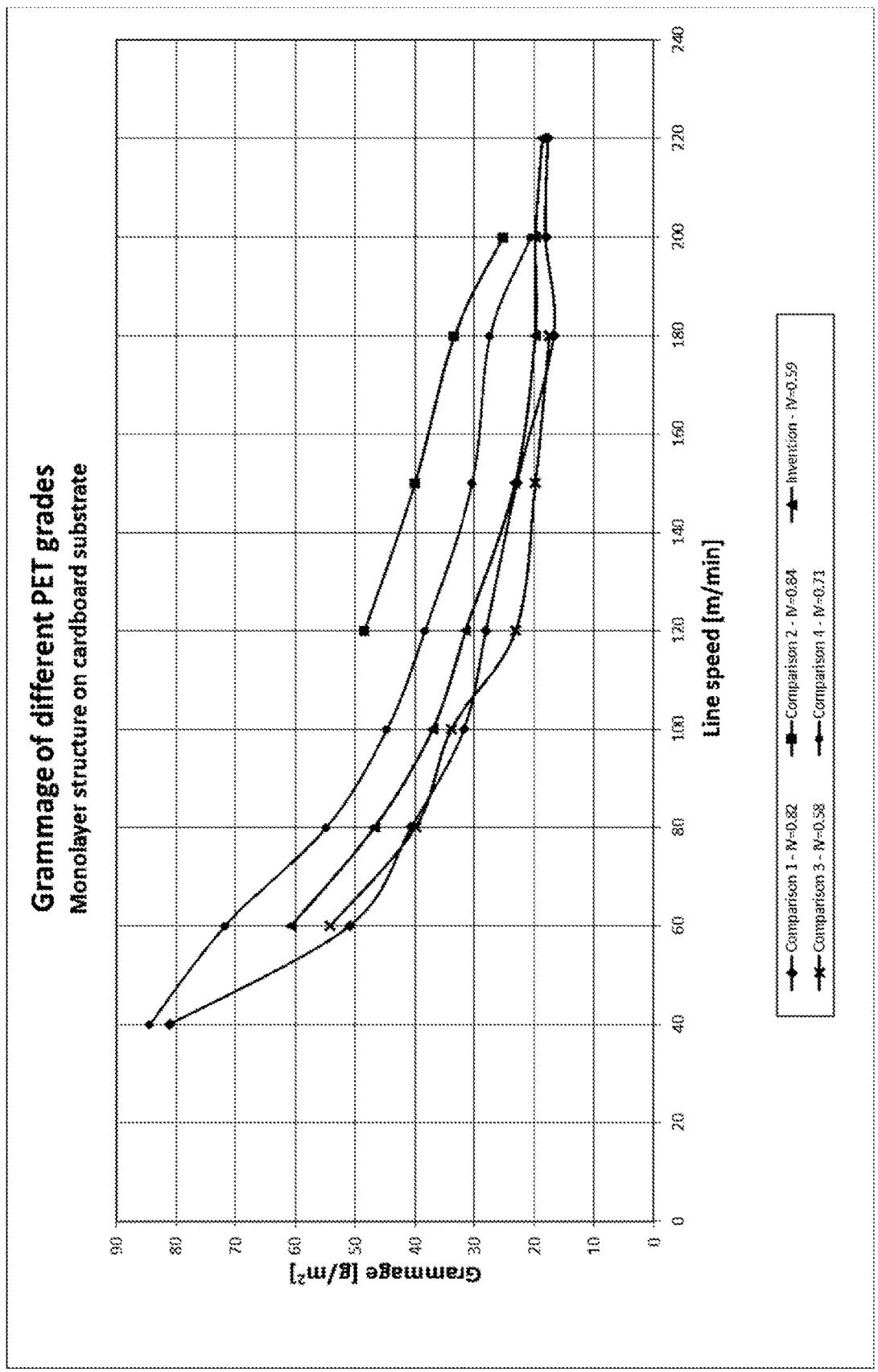
FIG. 4 is a diagram illustrating grammage as a function of the line speed in extrusion coating (monolayer) for different PET grades.
Figure 5:
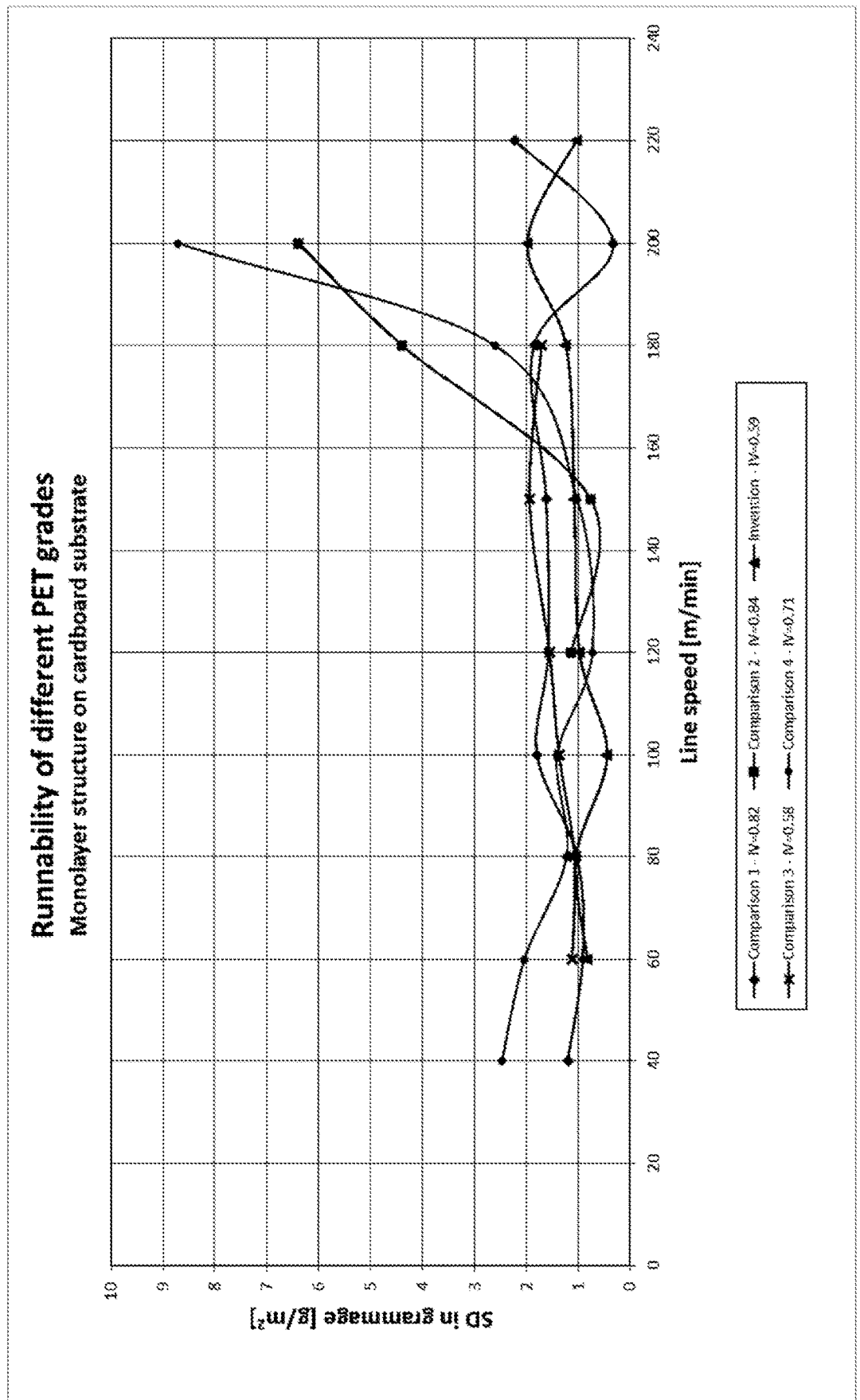
FIG. 5 is a diagram illustrating the runnability (the standard deviation in the grammage) as a function of the line speed in extrusion coating (monolayer) for different PET grades.

The adhesion as a function of the grammage in extrusion coating (monolayer, Extruder A, Plug AAAAA-DD, Air gap 130 mm, corona treatment 3.4 kW) for the five PET grades is shown in FIG. 3. The grammage as a function of the line speed in extrusion coating (monolayer) for the five PET grades is shown in FIG. 4. The runnability (the standard deviation in the grammage) as a function of the line speed in extrusion coating (monolayer) for the five PET grades is shown in FIG. 5.

The extrusion coating parameters were similar in the case of the five PET grades tested (see FIG. 3). The screw speed of the extruder A was 140 rpm resulting in the PET grade dependent throughput of 103-115 kg/h. The target melt temperature was about 300-310° C. (Comparison 1, 2 and 4) or 280° C. (Invention and Comparison 3).

Clearly the best overall properties were achieved with the low viscosity copolymer made from terephthalic acid, isophthalic acid, mono-ethylene glycol, and diethylene glycol (Invention).

TABLE 3

Properties of five different poly(ethylene terephthalate) grades tested in extrusion coating.

| Example | Composition | Intrinsic viscosity [dl/g] | Crystalline density solid [g/cm³] | Crystallinity solid state pellets [%] |
|---|---|---|---|---|
| Comparison 1 | Copolymer made from terephthalic acid, isophthalic acid, and mono-ethylene glycol | 0.82 ± 0.02 | 1.39-1.40 | 50 ± 5 |
| Comparison 2 | Copolymer made from terephthalic acid and mono-ethylene glycol | 0.84 ± 0.02 | 1.40 | ≥50 |
| Invention | Copolymer made from terephthalic acid, isophthalic acid, mono-ethylene glycol, and diethylene glycol | 0.59 ± 0.02 | >1.37 | >30 |
| Comparison 3 | Copolymer made from terephthalic acid, isophthalic acid, and mono-ethylene glycol | 0.58 ± 0.02 | 1.39-1.40 | 50 ± 5 |
| Comparison 4 | Copolymer made from terephthalic acid, isophthalic acid, and mono-ethylene glycol | 0.71 ± 0.02 | 1.39-1.40 | 50 ± 5 |

The invention claimed is:

1. A paper or paperboard comprising:
   at least one coating layer formed by extrusion coating of a PET (polyethylene terephthalate) resin,
   wherein the PET resin comprises at least 50% by weight of a PET copolymer having an intrinsic viscosity in a range of from 0.57 to 0.61 dl/g, as determined according to ISO 1628,
   wherein said PET copolymer is a PET copolymer comprising repeating units of terephthalic acid, isophthalic acid, monoethylene glycol, and diethylene glycol,
   wherein a molar ratio of terephthalic acid:isophthalic acid in said PET copolymer is in a range of from 99:1 to 50:50,
   wherein a molar ratio of monoethylene glycol:diethylene glycol in said PET copolymer is in a range of from 99:1 to 50:50.

2. The paper or paperboard according to claim 1, wherein said PET resin comprises at least 70% by weight of said PET copolymer.

3. The paper or paperboard according to claim 1, wherein a remainder of the PET resin is comprised of a PET having an intrinsic viscosity 0.7 dl/g or higher, as determined according to ISO 1628.

4. The paper or paperboard according to claim 1, wherein the PET resin is applied to a substrate at a grammage of less than 50 g/m$^2$.

5. The paper or paperboard according to claim 1, wherein the PET resin comprises at least one additional component selected from the group consisting of a polymer other than a PET, a pigment, a dye, and a filler.

6. The paper or paperboard according to claim 1, further comprising:
   at least one additional polymeric coating layer disposed on top of the extrusion coated PET resin, wherein the additional polymeric coating layer has a composition different from the extrusion coated PET resin.

7. The paper or paperboard according to claim 6, wherein said at least one additional coating layer comprises polyethylene terephthalate (PET), polyethylene (PE), polypropylene (PP), polylactic acid (PLA), or a combination thereof.

8. The paper or paperboard according to claim 6, wherein said at least one additional coating layer is formed by extrusion coating or by extrusion film lamination.

9. The paper or paperboard according to claim 6, further comprising:
   at least two additional polymeric coating layers disposed on top of the extrusion coated PET resin,
   wherein at least one of the at least two additional polymeric coating layers has a composition different from the extrusion coated PET resin, and
   wherein an outermost layer of the at least two additional polymeric coating layer comprises at least 50% by weight of a PET copolymer having an intrinsic viscosity of less than 0.7 dl/g, as determined according to ISO 1628.

10. An ovenable tray comprising paper or paperboard according to claim 1.

11. A method for manufacturing a PET resin coated paper or paperboard substrate, comprising:
   a) providing paper or paperboard substrate,
   b) applying at least one layer of molten PET resin to a surface of said substrate by extrusion coating,
   c) allowing the PET resin to cool down and solidify, and
   d) recovering the PET resin coated substrate,
   wherein the PET resin comprises at least 50% by weight of a PET copolymer having an intrinsic viscosity (IV) in a range of from 0.57 to 0.61 dl/g, as determined according to ISO 16282,
   wherein said PET copolymer is a PET copolymer comprising repeating units of terephthalic acid, isophthalic acid, monoethylene glycol, and diethylene glycol,
   wherein a molar ratio of terephthalic acid:isophthalic acid in said PET copolymer is in a range of from 99:1 to 50:50,
   wherein a molar ratio of monoethylene glycol:diethylene glycol in said PET copolymer is in a range of from 99:1 to 50:50.

12. The method according to claim 11, further comprising:
   applying at least one additional polymeric coating layer disposed on top of the extrusion coated PET resin,
   wherein the additional polymeric coating layer has a composition different from the extrusion coated PET resin.

13. The method according to claim 12, wherein said at least one additional coating layer comprises polyethylene terephthalate (PET), polyethylene (PE), polypropylene (PP), polylactic acid (PLA) or a combination thereof.

14. The method according to claim 12, wherein said at least one additional coating layer is formed by extrusion coating or by extrusion film lamination.

15. The method according to claim 12, wherein at least two additional polymeric coating layers are applied on top of the extrusion coated PET resin,
   wherein at least one of the additional polymeric coating layers has a composition different from the extrusion coated PET resin, and
   wherein the outermost additional polymeric coating layer comprises at least 50% by weight of a PET copolymer having an intrinsic viscosity of less than 0.7 dl/g, as determined according to ISO 1628.

16. The method according to claim 12, wherein the outermost additional polymeric coating layer comprises at least 50% by weight of a PET copolymer having an intrinsic viscosity of less than 0.65 dl/g, as determined according to ISO 1628.

* * * * *